United States Patent [19]

Beale

[11] E Re. 30,176

[45] Reissued Dec. 25, 1979

[54] STIRLING CYCLE TYPE THERMAL DEVICE

[75] Inventor: William T. Beale, Athens, Ohio

[73] Assignee: Research Corporation, New York, N.Y.

[21] Appl. No.: 806,312

[22] Filed: Jun. 13, 1977

Related U.S. Patent Documents

Reissue of:

[64] Patent No.: 3,552,120
Issued: Jan. 5, 1971
Appl. No.: 812,530
Filed: Mar. 5, 1969

U.S. Applications:

[63] Continuation-in-part of Ser. No. 613,272, Feb. 1, 1967, abandoned.

[51] Int. Cl.[2] ..... F02G 1/04

[52] U.S. Cl. ..... 60/520

[58] Field of Search ..... 60/517, 520, 525, 526

[56] References Cited

U.S. PATENT DOCUMENTS 2,558,481 6/1951 Dros ..... 62/6
3,319,416 5/1967 Renshaw ..... 60/517

FOREIGN PATENT DOCUMENTS 1407682 6/1965 France .

*Primary Examiner*—Allen M. Ostrager
*Attorney, Agent, or Firm*—Harold L. Stowell

[57] ABSTRACT

A Stirling cycle thermal engine or refrigerating device wherein there is no primary mechanical connection between the displacer pistons and their associated power pistons, including various mechanical and pressure fluid means for varying the power output from or the power input to the device.

7 Claims, 13 Drawing Figures

FIG 3.
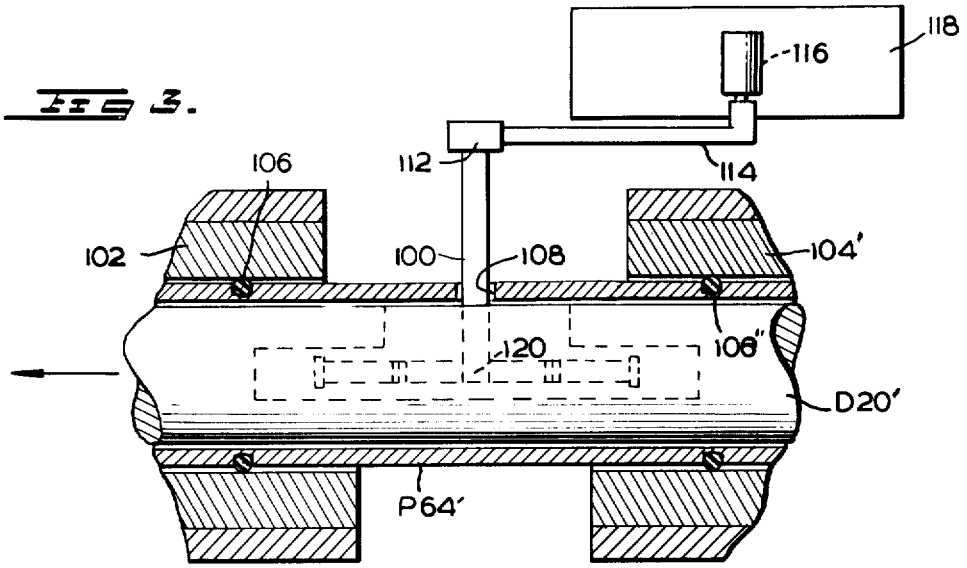
FIG 4.
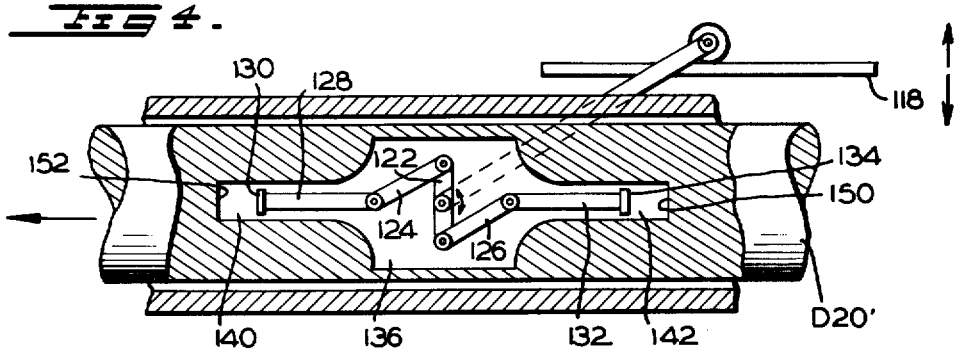
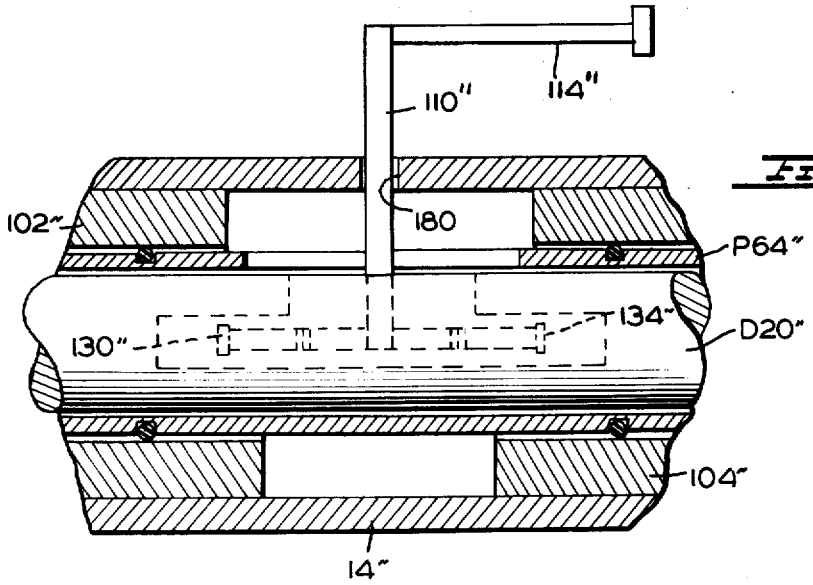
FIG 5.
BY

STIRLING CYCLE TYPE THERMAL DEVICE

Matter enclosed in heavy brackets [ ] appears in the original patent but forms no part of this reissue specification; matter printed in italics indicates the additions made by reissue.

This application is a continuation-in-part application of my application Ser. No. 613,272, filed Feb. 1, 1967, now abandoned.

This invention relates to an improved Stirling cycle type thermal device, having particular utility as an engine, a refrigerator, and/or a heat pump.

It is a particular object of the present invention to provide an improved Stirling cycle thermal device including at least one or more interacting displacer pistons and cooperating power pistons.

It is a further object of the present invention to provide such a device wherein there is no primary mechanical interconnection between the displacer pistons and their associated power pistons.

Another object of the present invention is to provide such a device having means for controlling the power output or the power input of the device without varying the mass of gaseous fluid involved in the cycle.

A further object is to provide such a device including means for providing either power input to the device or power output from the device through a fluid pressure cycle and without a mechanical coupling to the power pistons or the piston rod interconnecting the power pistons.

These and other objects and advantages are provided in a Stirling cycle type thermal device which generally comprises

- a displacer piston,
- a displacer cylinder zone,
- said displacer piston mounted for reciprocation in said displacer cylinder zone,
- a displacer piston rod connected at one end to said displacer piston and in fluid communication at the other end with a second zone,
- a power piston,
- a power cylinder,
- said power piston mounted for reciprocation in the power cylinder normally mechanically independent of the reciprocation of the displacer piston,
- a working fluid in said displacer cylinder zones,
- means creating a pressure differential between the displacer cylinder zone and said second zone adapted to act on the area of the piston rod in said second zone,
- said last named means including means for adding heat to or removing heat from each end of the displacer cylinder zone,
- means providing a power coupling between the displacer piston and the power piston consisting of fluid communication conductors between one end of the power cylinder and one end of the displacer cylinder zone.

The invention will be more particularly described in reference to the accompanying drawings wherein:

FIG. 3 is an enlarged fragmentary sectional view of the power input and output varying means;

FIG. 4 is a view like that shown in FIG. 3 with the mechanism, rotated 90° and with portions broken away to more clearly show the operating mechanism;

FIG. 5 is a view similar to that shown in FIG. 3 of a modified form of power varying means;

The principles of Stirling cycle thermal devices are well known in the art and a relatively comprehensive review of past and recent developments in Stirling thermal engines and the comparison of such engines with the Otto, Brayton, Carnot, and Ericsson cycle engines is found in volume 68 SAE Transactions, 1960, pp. 665–684. Since the principles of Stirling thermal cycle devices are well known to those skilled in the art, the following detailed discussion will be restricted to the improvements in the art brought about by the present invention.

Figure 1:
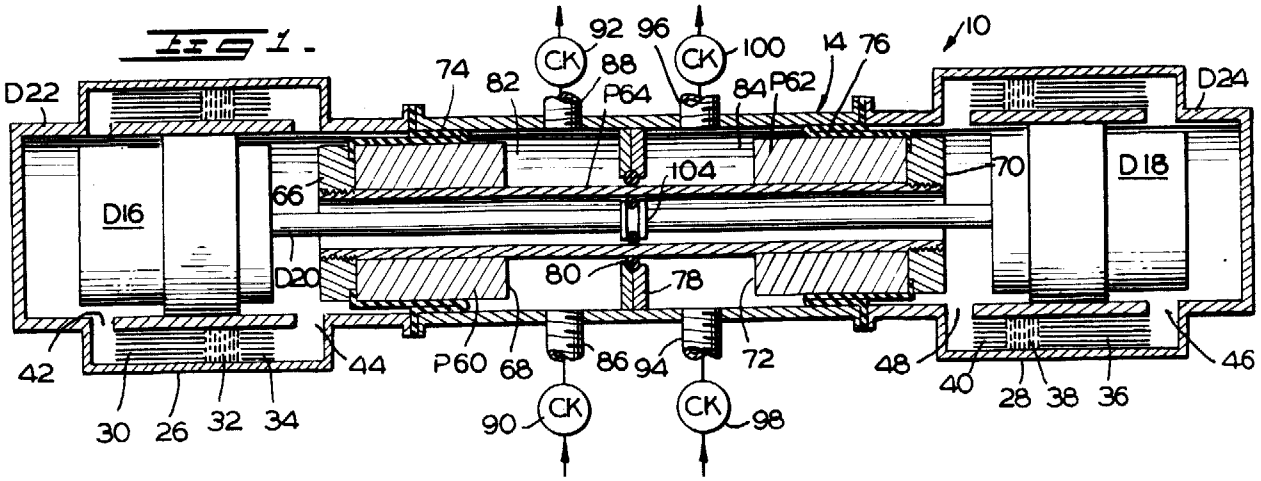
FIG. 1 is a generally schematic view of a dual displacer piston, dual power piston, Stirling cycle type thermal device incorporating the principles of the present invention.

Referring to FIG. 1 of the drawings, 10 generally designates a Stirling cycle type thermal device which includes a housing 14. The housing 14 encloses a pair of displacer pistons generally designated D16 and D18. The pistons D16 and D18 are connected for synchronous motion by a rigid displacer piston rod D20.

In FIG. 1 the displacer pistons D16 and D18 are illustrated in an intermediate position between their extreme left and extreme right direction of travel. With this arrangement when, for example, displacer piston D16 is at the extreme left position displacer piston D18 is also at the extreme left position. Associated with each of the displacer pistons is a displacer piston cylinder designated D22 and D24 for displacer pistons D16 and D18 respectively. The pistons D16 and D18 are sized to freely reciprocate in their respective cylinders and since the Stirling cycle is a closed cycle there is no need for piston rings and other sealing means between the cylindrical surfaces of the displacer pistons D16 and D18 and their respective cylindrical walls of the displacer cylinders D22 and D24.

Figures 6, 7:
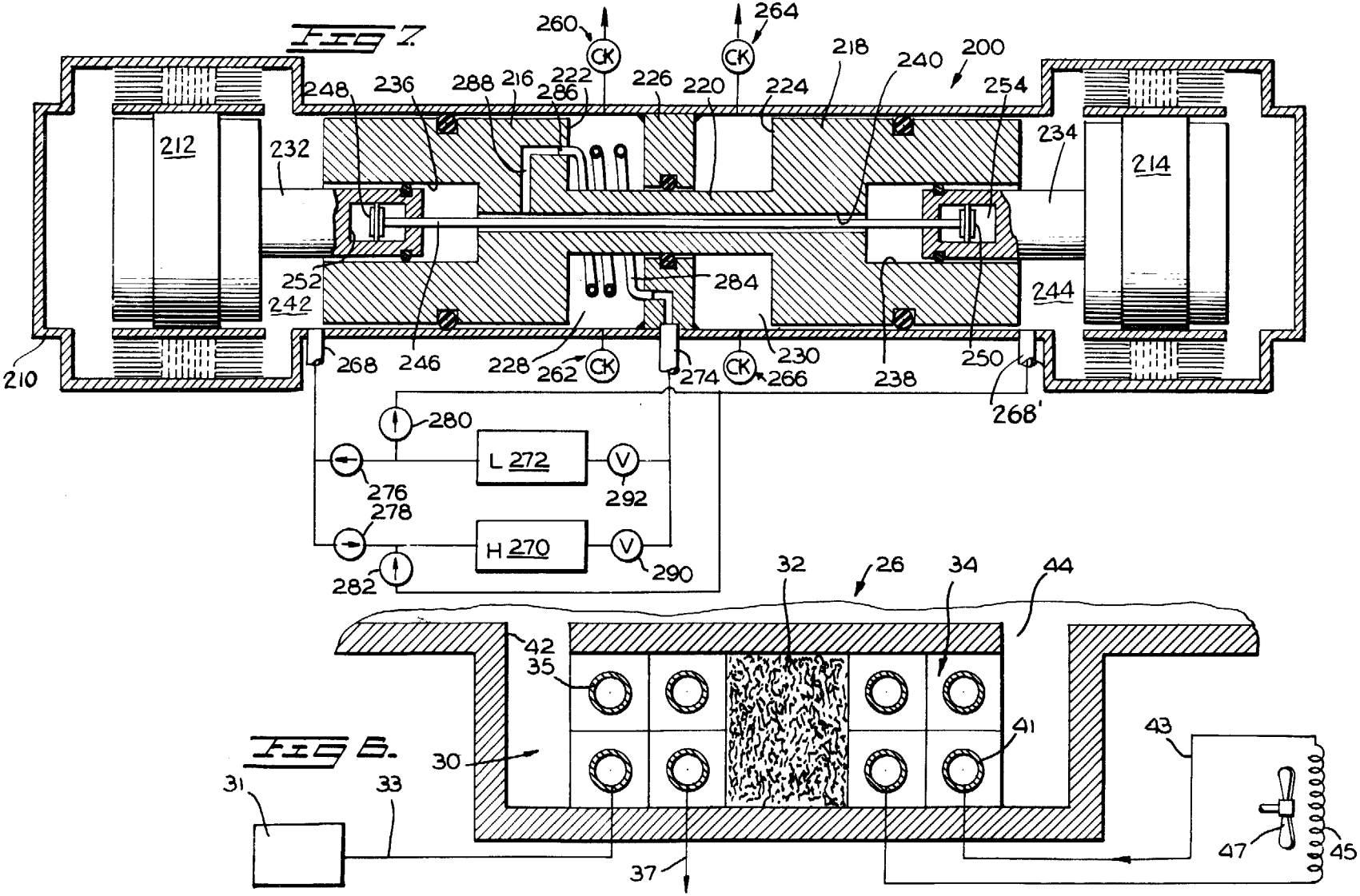
FIG. 6 is an enlarged fragmentary detailed view of one form of regenerator and heat exchanger which may be used with the devices of the present invention.
FIG. 7 illustrates a modified form of power varying means wherein the stroke of the displacer pistons is varied.

As more clearly shown in FIGS. 1 and 6, associated with each of the displacer cylinders D22 and D24 is a conventional combination heat exchange means and regenerator 26 and 28 respectively. The combination heat exchange means and regenerator 26 includes a heater portion 30, a regenerator 32 and a cooler 34 for cylinder D22 and corresponding elements 36, 38, and 40 for displacer cylinder D24. The heater 30 communicates with the outer end of cylinder D22 through the opening 42 while the cooler 34 communicates with the opposite end of the cylinder D22 via opening 44. Similar openings 46 and 48 are provided for displacer cylinder D24.

Referring specifically to FIG. 6, the heater section 30 for the regenerator, includes a burner 31 connected by conduit 33 to coiled heat exchange pipe 35. The heating medium from the burner 31 leaves the heater section 30 via conduit 37. The regenerator section 32 consists of a plurality of fine copper wires or needles which are relatively densely packed between the heater and the cooler sections 30 and 34. The cooler section consists of a coil 41 similar to heat exchange coil 35. The coil 41 may be supplied with a cooling medium such as water via conduit 43 having a heat exchange coil 45 therein external of the engine and blower means 47 associated therewith. Thus, one end of each regenerator 32 and 38 may be at 100° F. while the opposite end of each regenerator may be at 1000° F.

Also mounted in the housing 14 are a pair of power pistons P60 and P62. The power piston P60 and P62 are interconnected by a power piston rod P64 which rod surrounds corresponding displacer piston rod D20. The power pistons P60 and P62 are interconnected such that when one piston is at the head end of its cylinder the opposite piston is at the inner end of its cylinder.

The rod interconnecting the pair of power pistons is not necessary and a fluid coupling could be substituted therefor.

Each of the power pistons P60 and P62 has a pair of heads 66 and 68 for piston P60 and 70 and 72 for piston P62. Piston heads 66 and 70 communicate with the cool or cold portion of the cylinders D22 and D24 respectively. The heads 66 and 70 are isolated from their opposite heads 68 and 72 by sealing means 74 for piston P60 and 76 for piston P62. The heads 68 and 72 of pistons P60 and P62 are isolated by partition means 78 and O-ring seal 80 whereby a pair of power cylinder spaces 82 and 84 are provided in the device. Power cylinder space 82 is provided with fluid pressure inlet port means 86, outlet port means 88 and cooperating check valves 90 and 92. Similarly, power cylinder space 84 has inlet port means 94, outlet port means 96, and cooperating check valves 98 and 100.

The assembly also includes sealing means 104 between the outer surface of the displacer piston rod D20 and the inner cylindrical surface of the power piston rod P64.

OPERATION

The operation of the device illustrated in FIG. 1, when functioning as an engine with heat being added to the outboard ends of the displacer cylinders D22 and D24 by suitable heating means will be described hereinbelow. Assuming that the displacer pistons D16 and D18 are in the extreme left positions and the displacer piston cylinders D22 and D24 are charged with for example, hydrogen gas, at for example, 2000 psi., then the hydrogen in displacer cylinder D22 is in a cold region and the hydrogen in cylinder D24 is in a hot region and receiving heat from the external source of heat. Under these conditions pressure on the right side will be higher than on the left side as viewed in FIG. 1. The power pistons P60 and P62 will be driven toward the left by pressure fluid acting against the head 70 of power piston P62.

Assuming that cylinder spaces 82 and 84 are placed in communication with a source of fluid via check valves 90 and 98 and inlet conduits 86 and 94, fluid will be discharged from space 84 via outlet conduit 96 and check valve 100, while fluid will be drawn into space 82 via inlet conduit 86 and check valve 90.

As the power pistons move left, the volume change of the compressed hydrogen decreases the pressure of the hydrogen on the right side and increases the pressure on the left-hand side of the device as illustrated in FIG. 1. With the displacer piston D16 and the power piston P60 both to the left, then the pressure is substantially greater on the left and the displacer pistons are driven to the right by the pressure difference acting on the area of sealing means 104. As the displacer pistons D16 and D18 move to the right, hydrogen gas is moved from the cold region on the left to the hot region on the left, and from the hot region on the right to the cold region on the right. Under these conditions the pressure of the hydrogen on the left-hand side of the device increases, while the pressure of the hydrogen on the right-hand side of the device decreases, thus accelerating displacer piston motion and forcing the power pistons P60 and P62 towards the right to repeat the cycle. As the power pistons move to the right, the fluid in power cylinder chamber 82 is forced out of the outlet conduit 88 via check valve 92 while hydraulic fluid is drawn into cylinder space 84 via check valve 98 and inlet conduit 94. The fluid pumped by the power piston may be connected to any suitable pressure fluid type hydraulic motor and the like.

It will be particularly noted in reference to FIG. 1 that the compressed hydrogen, in flowing from one end of each of the displacer cylinder spaces to the opposite end, passes through the heater, the regenerator and the cooler in one direction of motion, and in the opposite direction passes through the cooler, the regenerator and then the heater. The heater, cooler and regenerator are, as is well known in the art, important features of Stirling cycle thermal devices and without such structures the efficiency of the devices is materially reduced as hereinbefore described. The reference to hydrogen gas as the charging medium is by way of example only and not by way of limitation as any desired fluid medium may be employed in the cycle, as is well known in the art.

The double ended device shown in FIG. 1 has an advantage in that it can be easily started in motion by any slight displacement of either power or displacer pistons, if the pumping load is removed from the power piston. This is so since with such a slight displacement, the resulting slight pressure difference would result in motion of the displacer which increases that pressure difference in the manner described above. Thus the device is to a large degree self starting provided only that the high and low temperatures are maintained in the appropriate spaces.

It will be appreciated, that since all that is required to bring about the completion of a cycle is the reversal of the pressure forces on the displacer and power pistons, a simple enclosed space may be substituted for the active spaces at one end of the device. For example, in FIG. 1, displacer piston D18 could be omitted, leaving only the displacer rod for the gas in space 48 and 46 to act upon as to be more fully described hereinafter.

It will be further appreciated that if the device shown in FIG. 1 were heated on one end only, and started by mechanical energy addition, then it would operate as a heat engine at one end, and a refrigerator at the other.

For example, if the left hand side were supplied with heating and cooling means, and the right side driven by the left side, then during the rightward motion of the pistons, the gas in the space 48 would be compressed, driving thermal energy into the heat exchanger 40, then, when the right side pressure increased to a value greater than the left side pressure, the displacer would first move left, transposing the gas from space 48 to 46, and from 42 to 44. Thus as the power piston moved left, the expansion of the gas in space 46 would cool it allowing heat to be removed from the heat exchanger 36. Thus it can be seen that the cycle operation of the heat engine on the left hand side would cause a cooling effect on heat exchanger 36 and a heating effect on heat exchanger 40 in the manner usual to Stirling cycle refrigeration machines. In such an application, the centrally positioned pumping spaces shown in FIG. 2 could be eliminated, since the work of the left hand heat engine would be absorbed by the right hand refrigerator. The power piston would then extend from 68 to 72, without the pumping spaces 82–84 intervening.

In order for the machine shown in FIG. 1 to operate effectively as an externally driven refrigerator, the correct phase relationship between the displacer and power pistons must be established by reducing the natural frequency of the displacer pistons relative to that desirable for a heat engine. In the heat engine mode of operation, it is desirable to have the displacer pistons move more quickly under the influence of pressure forces than the power pistons, whereas in the refrigeration cycle, the opposite is true.

Assume a hydraulic pump drives the power piston P60 left. The power piston would make contact with the displacer piston D16 which is being driven only slowly toward the right by pressure difference acting on its rod area. (It will be noted that check valves 90, 92, 98, and 100 are not necessary when the power piston are being driven by a double acting pump connected to lines 86 and 94 or 77 and 96, the unused pair of lines being blocked.) Then the power and displacer pistons P60 and P16 move left together, compressing the gas on the left and expanding the gas on the right of the device thus driving energy out to the left heat exchanger 30 and taking energy in from the right heat exchanger 36 and cooler 40. During this expansion phase a substantial mass of the gas at the right end of the device occupies both the cool and hot spaces. The power piston P60 then stops at its extreme leftward travel and quickly pistons P60 and P62 are driven toward the right by the opposite direction of movement of the double acting pump. The displacer pistons being to slowly move toward the right but piston D18 is soon pushed rapidly toward the right as the power piston P62 contacts the right displacer piston D18. Now the gas at the right hand end of the device is all at the hot end thereof, and is compressed, while the gas at the left hand end of the device is mostly in the cold region and is expanded, thus drawing energy in from the cold region.

In this application, the heat exchangers 30 and 36 are hot, while heat exchangers 40 and 34 are cold, thus providing the refrigeration effect at 40 and 34 with the discharge of heat at 36 and 30.

Figure 2:
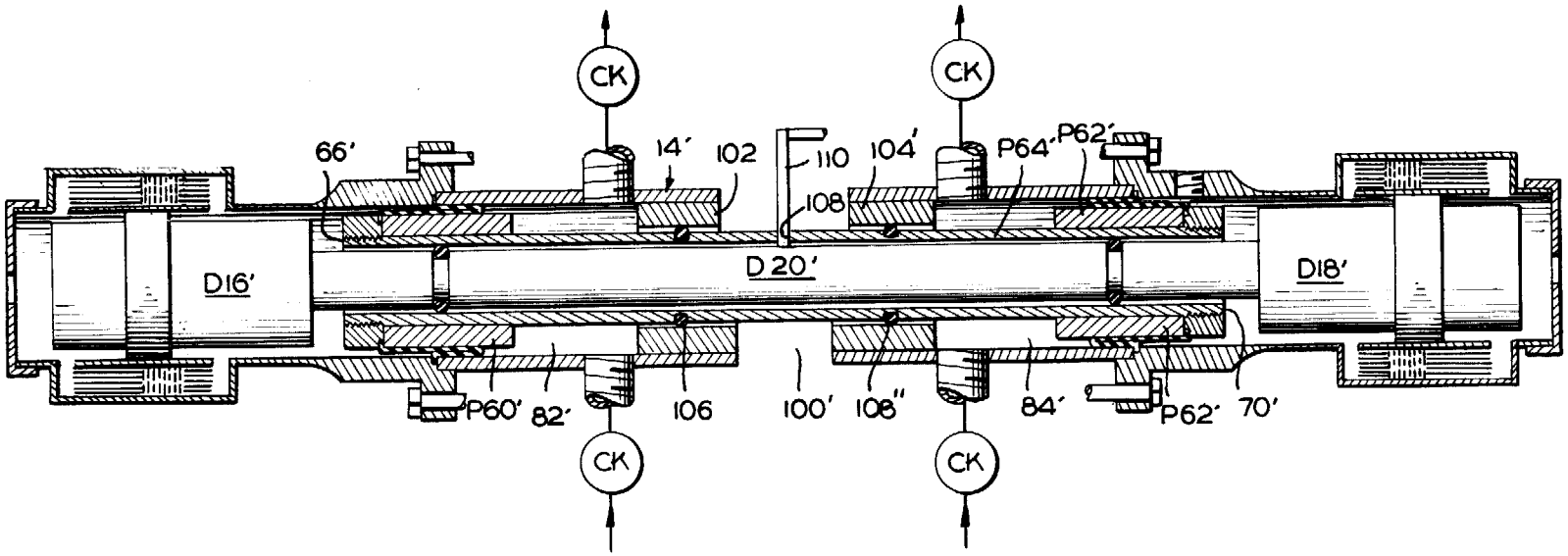
FIG. 2 is a view similar to that shown in FIG. 1 of a modified form of the present invention illustrating one means for varying the input and output of the device.

Referring now to FIGS. 2, 3, and 4, a modified form of the present invention is illustrated. The primary distinction between the form of the invention shown in FIGS. 2, 3, and 4 and that illustrated in FIG. 1 is that in FIGS. 2, 3, and 4 means are shown for varying the stroke of the displacer pistons and thereby varying the output of the device without altering the volume of the compressed gaseous medium in the displacer cylinders. Primarily, in FIG. 2 it will be noted that the housing 14' is discontinuous to provide a space 100' between the two ends of the device. The functions of spacer 78 and of seal 80 in the embodiment shown in FIG. 1 are provided for the embodiment of FIG. 2 by the cylinder end blocks 102 and 104' and by the corresponding seals 106 and 108'. The piston rod P64' for the power pistons P60' and P62' is bored as at 108 to receive a shaft 110. The external end of shaft 110 is provided, in the illustrated form of the invention, with an arm member 114 having a roller 116 at its extended end and the roller 116 is in contact with an adjustable plate or platform 118. The inner end 120 of shaft 110 is provided with a cross arm 122. The extended ends of the cross arm are pivotally connected to linkages 124 and 126. Linkage 124 is in turn pivotally connected to a plunger rod 128 having a stop member 130 on its extended end. Link member 126 is likewise connected to a plunger rod 132 having a stop member 134 at its extended end. The foregoing mechanisms are mounted within a recess 136 within the displacer piston rod D20'. The recess 136 is provided with axially extending bores 140 and 142 which receive the plunger rods and stop members. By raising or lowering the plate member 118 as illustrated by the arrows in FIG. 4, the arm 114 rotates shaft 110 which in turn rotates cross arm 122 to move the stop members 130 and 134 toward or away from the ends 152 and 150 of the bores 140 and 142 in the displacer piston rod D20'.

The foregoing variable stop members function as follows: Assuming the displacer piston rod D20' is moving towards the left, in the direction of the directional arrow, and stop members 130 and 134 are positioned as illustrated, the displacer pistons and their piston rod D20' will continue to move left until the surface 150 in the bore 142 strikes the extended end of the stop plate 134. Thereafter, since the shaft 110 passes through a bore 108 in the power piston rod P64', further motion of the displacer piston rod D20' will create a corresponding motion in the power piston rod P64' and the displacer piston assembly will carry the power piston assembly leftwardly with it until the displacer piston assembly reaches the end of its stroke. Thus, the volume between the left hand surface of displacer piston D18' and the head 70' of the corresponding power piston P62' will not decrease and correspondingly the space between the right hand end of displacer piston D16' and head 66' of the power piston P60' will not increase once the stop member 134 and surface 150 have come into contact. Thus the pressure of the gaseous medium will not change as greatly as in the case of unrestricted displacer motion, and the power output of the engine will be limited.

It will be appreciated that during the opposite direction of movement of the displacer piston rod D20' the opposite stop member 130 will contact the end face 152 of bore 140, providing an equivalent power limiting means for the reverse stroke of the engine. It will also be appreciated that by movement of the plate 118 and the control arm 114 the end stop members 130 and 134 may be preset in relationship to their respective end walls 152 and 150 in the bores 140 and 142 in the displacer piston rod D20'.

With the above-described arrangement the stroke of the displacer pistons can be adjusted while the engine is running.

In FIG. 5 a further means for varying the stroke of the displacer piston is illustrated. In FIG. 5 the displacer piston rod is designated D20' while the power piston rod is designated P64'. The view illustrated in FIG. 5 is like that shown in FIG. 4 and the elements 102' and 104' comprise cylinder end portions for the power cylinders. The displacer piston rod D20' is recessed in the same manner as illustrated in FIGS. 3 and 4 for piston rod D20'. In the opening within the piston rod D20' is an adjustable stop mechanism identical in form to that shown in FIGS. 3 and 4, the control mechanism being attached to a control rod 110' which in turn is connected to an actuator rod 114'.

It will be particularly noted that the control rod 110' does not pass through a small bore in the power piston rod P64' as illustrated in FIG. 3. Instead the power piston rod P64' is slotted such that when one of the stop members 130' and 134' engages the end of its corresponding bore the movement of the displacer piston rod D20' is stopped. The stopping action is through the external housing 14' which is bored as at 180 to rotatably receive the control rod 110'. This form of the invention need not include a plate member 118 permitting sliding motion between the end of the actuating rod 114' as there is no sliding motion in this form of the invention since the control rod 110' is stationary with respect to the main housing of the engine.

From the foregoing description of specific embodiments of the present invention it will be seen that the recited and other advantages are fully accomplished. It will also be recognized by those skilled in the art that the mechanical stop means illustrated in FIGS. 2, 3, 4, and 5 may be replaced by hydraulic limiters which hydraulic limiters may function on the working fluid or be independent thereof. The use of hydraulic limiters has the advantage that the force exerted on the hydraulic working fluid in stopping the motion of the displacer pistons is not lost as in the form of the invention illustrated in FIG. 5 because the stopping force is transmitted to the working fluid and thereby augments the working output of the device. The hydraulic control means for hydraulic limiters of this nature are generally more expensive than the illustrated mechanical means in view of the necessity for having a number of control valves and the like in the hydraulic system.

One form of power limiting means using the working fluid is illustrated in FIG. 7. Referring to FIG. 7, the engine 200 generally includes a housing 210, displacer pistons 212 and 214 which displacer pistons are slidably mounted within cylinders formed in the housing 210 and the cylinder spaces may be provided with regenerators such as illustrated in FIG. 6. The apparatus also includes a pair of power pistons 216 and 218 interconnected by a rigid power piston rod 220. The inner faces 222 and 224 of power pistons 216 and 218 respectively, in conjunction with a rigid wall 226, and the housing 210 define a pair of working fluid spaces 228 and 230, respectively.

Each of the displacer pistons 212 and 214 is provided with a short stublike piston rod 232 and 234 respectively and each of the displacer piston rods 232 and 234 reciprocates in a bore 236 and 238 in the lower pistons 216 and 218 respectively. Bores 236 and 238 are interconnected by a further bore 240 which passes through a portion of each of the power pistons 216 and 218 and centrally through the power piston rod 220. Suitable sealing means isolate the spaces 236 and 238 from the displacer piston spaces 242 and 244.

The assembly also includes a stop or limit rod 246 which is freely slidable within the bore 240 and each end of the limit rod 246 is provided with an enlarged end portion generally designated 248 at one end and 250 at the other. The enlarged end portions ride in bores 252 and 254 formed in their respective stub-piston rods 232 and 234 respectively.

The power piston working spaces 228 and 230 are suitably connected to conduit means and check valves 260 and 262 and 264 and 266 respectively which conduits and valves control the flow of pressure fluid into and from the said spaces and the working fluid exiting via conduits and control valves 260 and 264 may be connected to any suitable device to be operaed by the system.

In order to vary the output of the system, in the present form of the invention, the working fluid within the displacer cylinders is connected to the small bores 236 and 238, via conduits 268 and 268', high and low pressure fluid accumulators 270 and 272, conduit 274 and check valves 276, 278, 280, and 282. Conduit 274 is connected to one end of a hollow helical spring 284 and the other end 286 of the hollow spring is connected to an internal bore 288 in power piston 216 which internal bore 288 permits the working fluid to flow to both of the bores 236 and 238. The control system also includes valves 290 and 292 in the high and low pressure lines from the high and low pressure accumulators 270 and 272.

From the foregoing description it will be seen that the displacer pistons 212 and 214 are not connected except by a free-floating limit rod 246 which maintains inner and outer limits on the displacer piston separation and by the gaseous working fluid at the inner ends of the displacer piston's stub shafts or rods 232 and 234. The gas maintained at the inner end of each of the stub shafts 232 and 234 can be varied in amount, or volume, by bleeding it out to the low pressure reservoir 272 via valve 290 or by adding a greater quantity from the high pressure reservoir 270 via valve 292.

During cyclic movement of the power and displacer pistons the check valves 276, 278, 280, and 282 maintain maximum cycle pressure in the accumulator 270, and minimum cycle pressure in the accumulator 272.

The displacer stroke may be reduced to a minimum allowed by the limit rod 246 by allowing gas to flow out of spaces 236 and 238 through control valve 290 into the low pressure accumulator 272, thus limiting the power output of the machine. If greater power is desired, gas may be admitted to spaces 236 and 238 through valve 292 from the accumulator 270. The displacer stroke may thus be increased by any increment desired until the maximum stroke allowed by the limit rod 246 is reached.

It will be noted that when the displacer pistons are not at either maximum or minimum position as determined by the limiter rod, they may move somewhat independently, since the working fluid in spaces 236 and 238 is elastic, but their overall motion is controlled by the volume of gas in those spaces.

A further form of the present invention is illustrated in FIGS. 8, 9, 10, and 11. In FIGS. 8, 9, 10 and 11, 300 generally designates an improved Stirling cycle thermal device which includes a housing 310 within which is reciprocally mounted a pair of displacer pistons 312 and 312'. The displacer pistons are associated with conventional regenerator means not shown in these figures. The system also includes a pair of cylindrical power pistons 316 and 318. Each of the power pistons 316 and 318 is centrally bored to permit reciprocation of the displacer piston rod 314 therethrough. Within the housing 310 is a large block element 320. The block is provided with a plurality of bores 322, 322a, and 322b which receive small pistons 324 and 324a and 324b connected to the inner face of power piston 316. Power piston 318 is also provided with three piston or extensions 326, 326a, and 326b which reciprocate with their piston 318 in bores 328, 328a, and 328b formed in the opposite end of the block 320. The block is further provided with a bore 330 for the displacer piston rod 314 and three small bores 332, 332a, and 332b which interconnect generally dead spaces 334 and 336 between the inner surfaces of the power pistons 316 and 318 and the outer faces of the block 320. These small bores are necessary so that during reciprocation of the power pistons and their connected rods the pressure in these spaces may be equalized. The inner ends of each of the small pistons extending from the primary power pistons 316 and 318 are interconnected for cooperative reciprocation by small rods 338, 338a, and 338b.

From the foregoing description it will be seen that there are six working spaces and one pair of spaces 340 and 342 in the block member 320.

Figure 11:
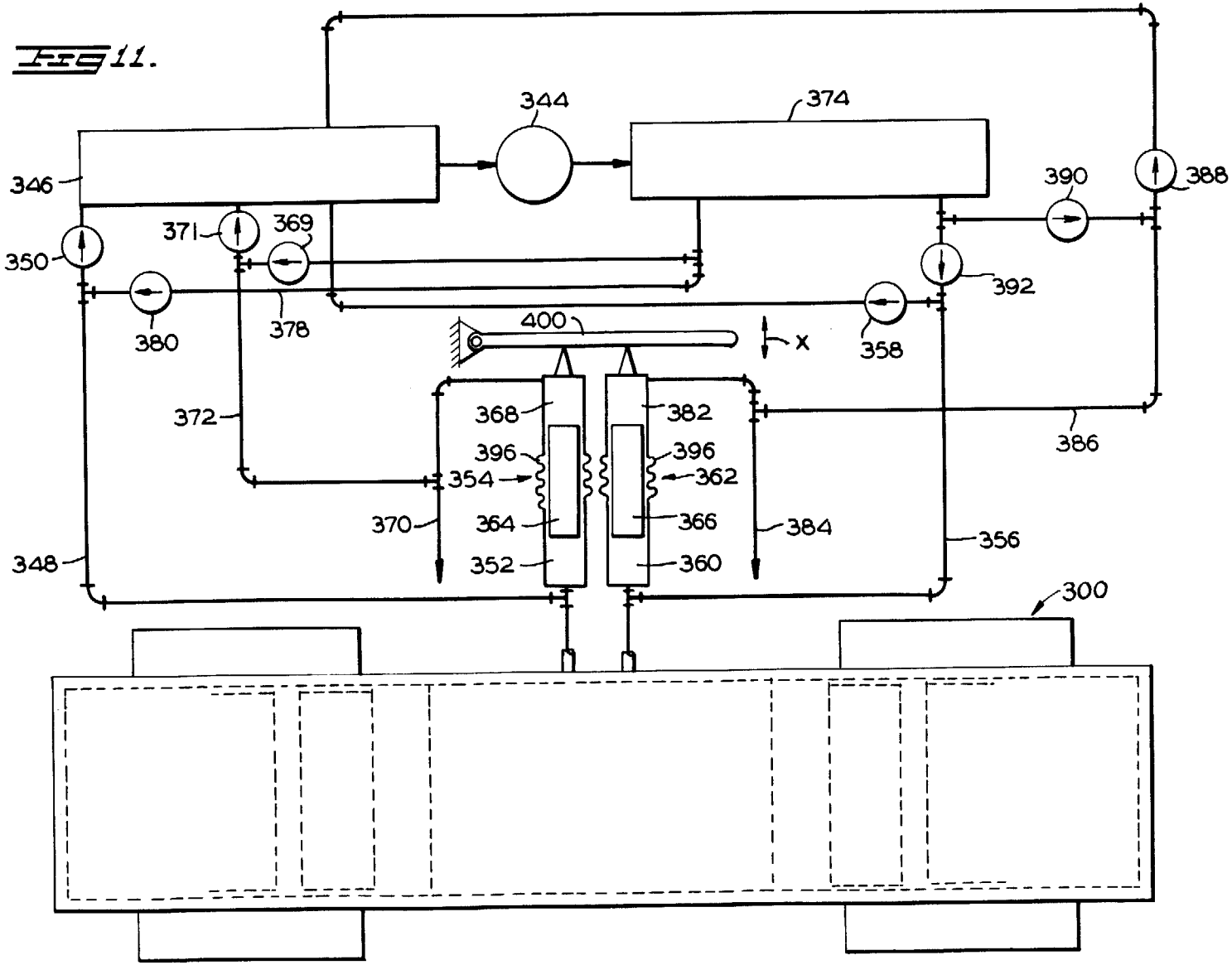
FIG. 11 is a diagrammatic view of the hydraulic circuitry connected to the structures shown in FIG. 8.

Each of the six spaces 322, 322a, and 322b and 328, 328a, and 328b are connected to, for example, hydraulic motor 344, FIG. 11, via a pressure fluid control system which permits limiting of the stroke of the power pistons 316 and 318 which in turn restrict the output from the device without bleeding of working fluid. For simplicity of description the hydraulic control system shown in FIG. 11 will be described as being connected to only spaces 322 and 328, however, as indicated hereinabove all six spaces would be interconnected and operate in unison. Space 322 is connected to a high pressure hydraulic accumulator 346 via conduit 348 and high pressure check valve 350. The space 322 is also connected to cylinder space 352 of controller or shuttle valve means 354. The high pressure accumulator 346 is connected to the hydraulic motor 344.

Cylinder space 328 is also connected to the high pressure accumulator 346 via conduit 356 and high pressure check valve 358.

Cylinder space 328 is also connected to the lower space 360 of shuttle valve means 362. The two shuttle valves 354 and 362 each has a floating piston therein generally designated 364 and 366 respectively. Above free floating piston 364 is a space 368 which is connected by line 370 to the space 342 in block 320. A further line 372 and check valves 369 and 371 connect line 370 to the low pressure hydraulic accumulator 374 and to the high pressure accumulator 346. Further a line 378 connects the low pressure accumulator through check valve 380 with line 348. Similarly space 382 above floating piston 366 is connected via line 384 to space 340 in block 320. A further line 386 is connected to the high and low pressure accumulator via high and low pressure check valves 388 and 390 while line 356 is also connected to the low pressure accumulator 374 via check valve 392. A portion of the walls of each of the shuttle valve means 354 and 362 comprise bellows-like elements 396 and the device includes a lever arm 400 which when moved upwardly increases the effective length of the cylinders of the shuttle valve means 354 and 362 and when the lever arm is moved downwardly as shown by arrow x the cylinder spaces are decreased.

It will be appreciated that the bellows-like elements 396 of the shuttle valve means 354 and 362 could be replaced by suitable telescopic cylinders of known construction.

From the foregoing description it will be seen that the power pistons are directly connected to hydraulic pistons 324 and 326, etc., which act in a normal manner in conjunction with inlet and exit flow control check valves and are connected to the high and low pressure accumulators or tanks 346 and 374. The shuttle valve means 354 and 362 act to interconnect the hydraulic pump pistons and the displacer piston rod 314 hydraulically. Thus, for a given motion to the right, for instance, of the hydraulic pump pistons 324 and 326, etc., the displacer pistons must move a proportionate amount in the same direction. This movement of the displacer pistons relative to the hydraulic pump pistons is determined by the ratio of the volume of the spaces 340 and 342 to the sum of the displacement of the hydraulic pistons 324 and 326, etc. If it is desired to have the displacer pistons 312 and 312' move three inches for every inch of motion of the power pistons then the diameter of displacer piston rod 314 would equal the diameter of one of the six hydraulic pistons 324, 324a, 324b, 326, 326a, and 326b.

Figure 8:
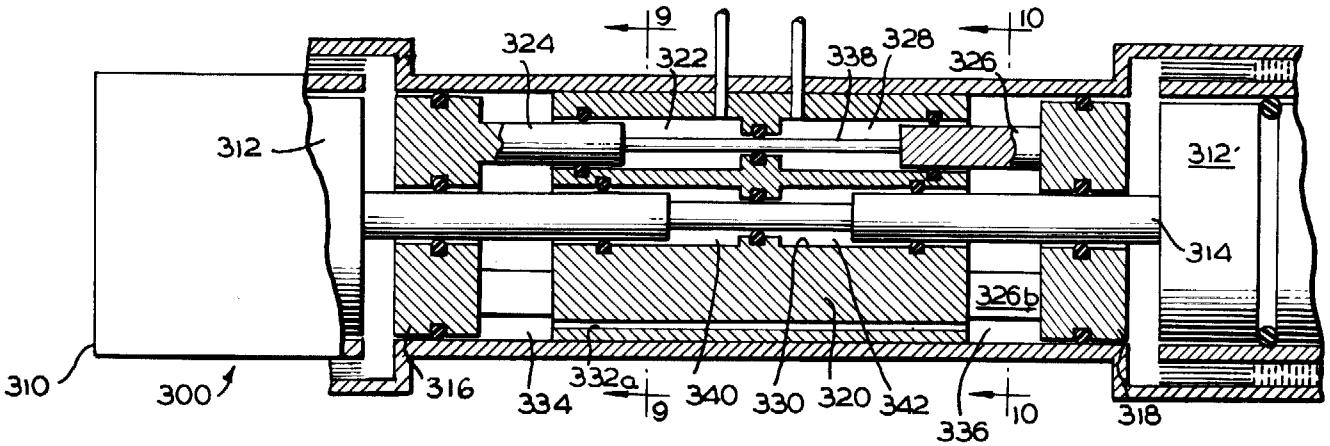
FIG. 8 illustrates a modified form of the present invention wherein hydraulic fluid, in the work cycle of the engine, is employed as the power limiting means.
Figure 10:
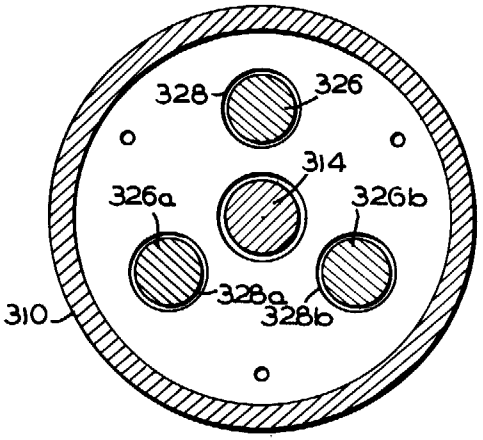
FIG. 10 is a section on line 10—10 of FIG. 8.
Figure 9:
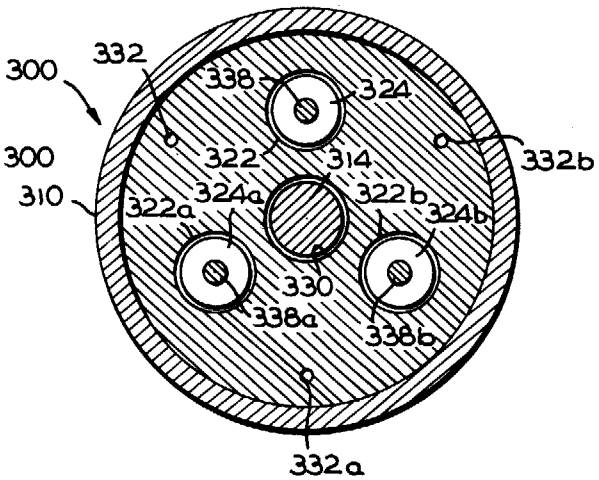
FIG. 9 is a section on line 9—9 of FIG. 8.

It will be particularly noted from an examination of, for example, FIGS. 8 and 11 that the displacer movement is not completely restrained to move exactly in phase with the power pistons since the check valves permit the inertia of the displacer pistons to carry them beyond the position which would normally be allowed by the shuttle valves.

It will be further appreciated that the shuttle valve means may be moved by the lever 400 to restrict or to increase the motion permitted of the displacer pistons. For example, as the power piston is moved to the right, hydraulic fluid is moved into space 342 and out of space 340 until the left shuttle piston 364 reaches the top of its cylinder space 368, and the right shuttle piston 366 reaches the lower end of cylinder space 360 at which time the flow of hydraulic fluid is restrained by the shuttle valve and the displacer pistons must work against the hydraulic pressure differential in the accumulators in order to continue further movement.

Figure 12:
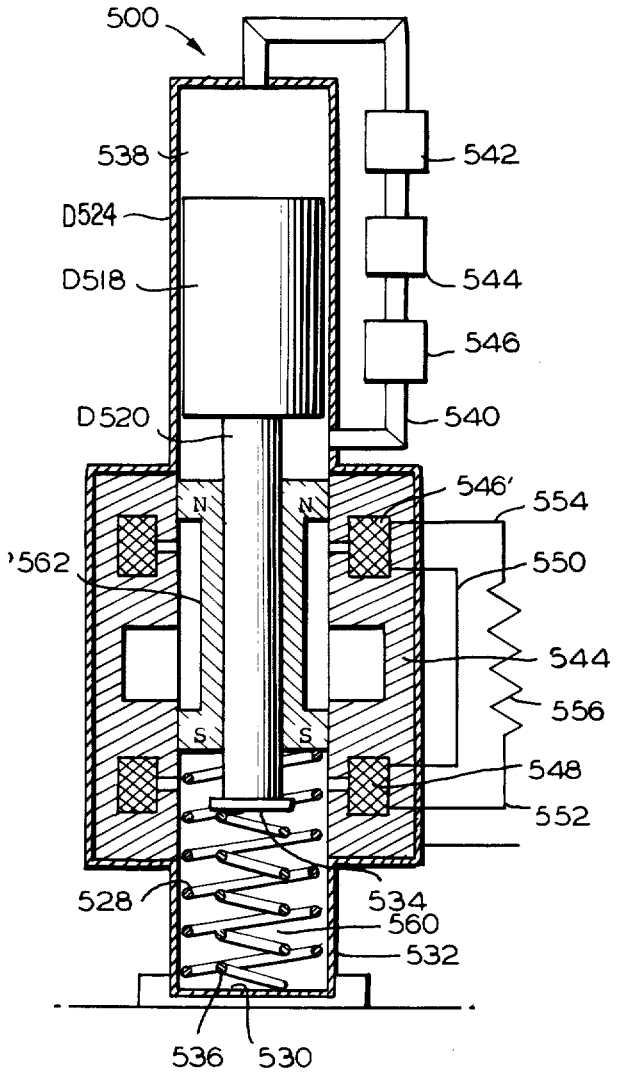
FIG. 12 illustrates a modified form of a combined single displacer piston type engine and linear alternator.

Referring specifically to FIG. 12 of the drawing there is illustrated an embodiment of the invention wherein the engine consists of a single displacer piston and a single power piston in combination with a linear electric generator. The combined device is generally designated 500 and consists of a displacer piston D518 having one end of a displacer piston rod D520 secured thereto. The piston D518 is mounted for reciprocation in a cylinder D524 with, for example, conventional clearance between the outer surface of the displacer piston and the bore in the cylinder.

Mounted about a portion of the displacer piston rod D520 is a power piston P562. The piston P562, in the illustrated form of the invention consists of a permanent magnet having the illustrated poles. The piston is biased into an upper position by a helical spring 528 which bears at its lower end against the lower end 530 of the engine housing 532. The lower end 534 of the rod D520 is also biased by a spring 536 similar to spring 528 hereinabove described. It will also be noted that the lower end 534 of the rod D520 has a peripheral boss thereabout which acts as a limit on the relative axial movement between the power piston and the displacer rod.

The displacer piston D518 reciprocates in the cylinder zone 538 which is charged with a predetermined amount of working fluid such as hydrogen. The upper and lower ends of cylinder zone 538 are connected by a gas flow passage which passage may contain a heater 542; regenerator 544 and a gas cooler 546 as is conventional with Stirling cycle type engines.

In order to remove power or work from the engine the portion of the engine casing within which the power piston P562 normally reciprocates is surrounded by an iron core 544 and coils 546' and 548 which coils are connected by a suitable electrical conductor 550 and by other electrical conductors 552 and 554 to a load device 556 so that as the magnetic power piston reciprocates an electric voltage is generated in the coils 546' and 548 as is known in the art.

PRINCIPLE OF OPERATION

In operation of this form of the invention the engine is provided with a light weight displacer piston and rod, a relatively heavy piston P562 and heat is applied to the heater 542. The heater increases the temperature at the upper end of the displacer piston, zone 538, and the increasing gas pressure acting on the displacer piston rod area pushes the displacer downwards. The downward moving displacer piston moves the working gas from the cold to the hot space, thus further increasing its pressure relative to the pressure or force of spring 536 and gas below the rod D520, and accelerating the displacer motion downward. When the displacer reaches the top of the power piston P562 the power piston and displacer then move downward together until the pressure differential between the working spaces and the force of springs 528 and 536 has reversed as a result of the expansion of the working gas and the compression of the springs and of the bounce gas in space 560 and consequently the displacer piston begins to move upward. This upward motion of the displacer piston moves hot gas to the cold space, reducing the working gas pressure and accelerating the motion of the displacer upward. The power piston and displacer piston then move upward together until the increasing working gas pressure forces the displacer down. The cycle then repeats.

The ratio of the force of the working fluid/and the mass of the displacer piston must be larger than such force/mass ratio of the power piston, otherwise the power piston will move with or ahead of the displacer, and no pressure differential will be developed.

The engine shown in FIG. 12 proved to be self-starting on the application of heat and reliable in operation. It had no internal lubrication except glass-filled Teflon tape on the power piston to provide an easily adjusted diameter for a close fit in the cylinder. There were no piston rings or other seals in the annular gaps of approximately 0.001 inch around the power piston and displacer rod. Since the engine was adapted to run in a vertical position, there are no side loads except small ones imposed by imperfect spring alignments and asymetrical gas flows.

Figure 13:
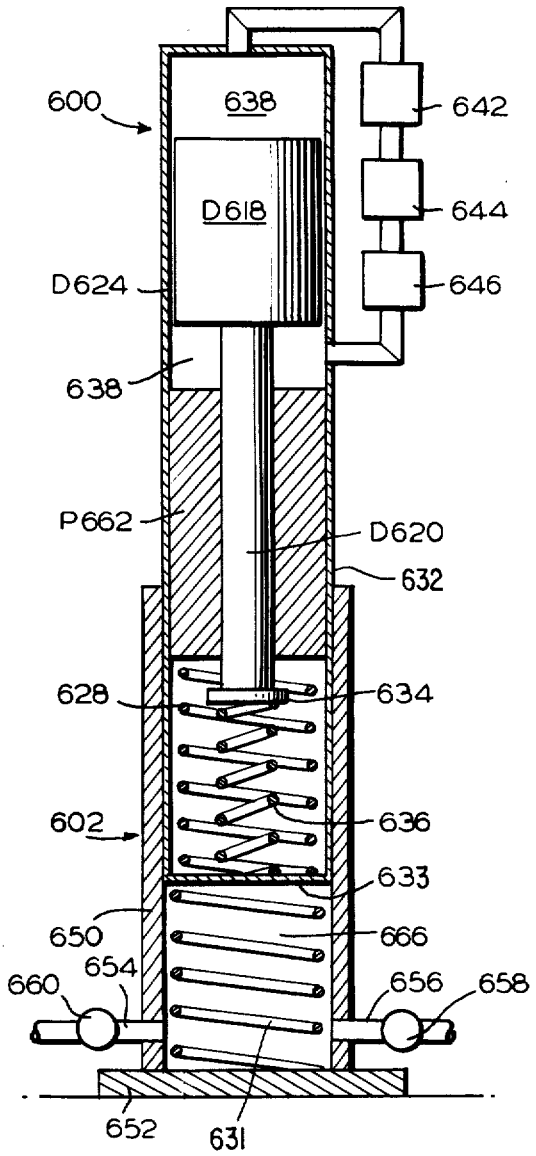
FIG. 13 illustrates a combination engine and pump constructed in accordance with the teachings of this invention.

A further form of engine constructed in accordance with the teachings of the present invention is illustrated in FIG. 13 wherein a combination pump and free piston Stirling engine is shown at 600.

In FIG. 13 the engine consists of a single displacer piston D618 and a single power piston P662 in combination with a pump generally designated 602. The combined device consists of a displacer piston D618 having one end of a displacer piston rod D620 secured thereto. The piston D618 is mounted for reciprocation in a cylinder D624 with, for example, conventional clearance between the outer surface of the displacer piston and the bore in the cylinder.

Mounted about a portion of the displacer piston rod D620 is the power piston P662. The piston P662, in the illustrated form of the invention consists of a hollow cylindrical member. The power piston is biased into an upper position by a helical spring 628 which bears at its lower end against the lower end 633 of the closed engine housing 632. The lower end 634 of the rod D620 is also biased by a spring 636 similar to spring 628 hereinabove described. It will also be noted that the lower end 634 of the rod D620 has a peripheral boss thereabout which acts as a limit on the relative axial movement between the power piston and the displacer rod.

The displacer piston D618 reciprocates in the cylinder zone 638 which is charged with a predetermined amount of working fluid such as hydrogen. The upper and lower ends of cylinder zone 638 are connected by a gas flow passage which passage may contain a heater 642; regenerator 644 and a gas cooler 646 as is conventional with Stirling cycle type engines.

In order to extract work from the engine the lower portion of the engine casing, within which the power piston P662 normally reciprocates, makes a sliding fit within a pump cylinder 650. A further helical spring 631 in pump chamber 666 urges the lower end 633 of the engine housing 632 away from the base 652 of the pump unit 602.

At the lower end of the pump cylinder 610 are a pair of conduits 654 and 656 provided with one-way inlet and outlet check valves 658 and 660. Further inlet conduit 656 is connected to a source of liquid to be pumped and outlet conduit 654 is connected to piping as desired.

PRINCIPLE OF OPERATION

The operation of the free piston engine described with reference to FIG. 13 is such that when the heater increases the temperature of the working fluid in the upper portion 638 of the cylinder D624, the increasing gas pressure acting on the displacer rod area pushes the displacer piston down. The downward moving displacer piston moves the working gas from the cold to the hot space, thus further increasing its pressure relative to the force of spring 636 and compression of the gas below the displacer rod and accelerating the displacer motion downward. When the displacer piston reaches the top of the power piston, it and the displacer piston then move downward together until the pressure differential between the working spaces and the force of springs 628 and 636 has reversed as a result of the expansion of the working gas and the displacer begins to move upward. This upward motion of the displacer moves hot gas to the cold space, reducing the working gas pressure and accelerating the motion of the displacer upward until it reaches an upper limit set by the limit stop 634 on the bottom end of the displacer rod. The power piston and displacer piston then move upward together until the increasing working gas pressure forces the displacer down. The cycle then repeats.

The downward motion of the displacer piston and the power piston cause the engine housing 632 to move upward drawing liquid into the pump chamber 666 via inlet 656 while downward motion of the engine housing into the pump chamber 666 forces the liquid to be pumped to flow out through conduit 654.

From the foregoing description of the operation of the pump shown in FIG. 13 it will be seen that the heavy piston P662 is used as a seismic mass against which the engine housing 632 is free to move as the internal pressures in the hot space and the lower springs vary. This concept was tested with a small model and it proved to be reliable and quiet in operation, and in addition had the useful feature that it could not be stalled by an overload, since any excessive restraint on the cylinder 632 would cause a larger fraction of the cycle work to be transmitted to the piston, with consequently greater cyclic pressure variations and greater forces on the cylinder.

Another useful property of the free cylinder engine of FIG. 13 is that it can produce useful work while at the same time being completely sealed and may be expected to hold its charge of gas for a reasonable time without significant depreciation of performance. Since the engine-pump is particularly simple and rugged and the heat engine is capable of self-starting and requires only elementary maintenance to the water pump, it should show promise as a solar powered pump for remote or under-developed areas.

It will be appreciated that various modifications may be made in the specific form of the disclosed structures. For example, while each of the specific embodiments illustrates coaxial alignment of the power pistons and the displacer pistons with concentric piston rod means, the power pistons may conveniently be out of coaxial alignment with their cooperating displacer pistons as long as fluid flow is maintained between one end of each of the displacer pistons and its cooperating power piston.

I claim:

[1. A Stirling cycle type device comprising a displacer piston, a displacer cylinder zone, said displacer piston mounted for reciprocation in said displacer cylinder zone, a displacer piston rod connected at one end to said displacer piston and in fluid communication at the other end with a second zone, a power piston, a power cylinder, said power piston mounted for reciprocation in the power cylinder normally mechanically independent of the reciprocation of the displacer piston, a working fluid in said displacer cylinder zone, means creating a pressure differential between the displacer cylinder zone and said second zone adapted to act on the area of the piston rod in said second zone, said last named means including means for adding heat to or removing heat from each end of the displacer cylinder zone, means providing a power coupling between the displacer piston, and the power piston consisting solely of fluid communication conductors between one end of the power cylinder and the displacer cylinder zone.]

[2. A Stirling cycle type device comprising a displacer piston, a displacer cylinder zone, said displacer piston mounted for reciprocation in said displacer cylinder zone, a displacer piston rod connected at one end to said displacer piston and in fluid communication at the other end with a second zone, a fluid in said second zone, a power piston, a power cylinder, said power piston mounted for reciprocation in the power cylinder normally mechanically independent of the reciprocation of the displacer piston, a working fluid in said displacer cylinder zone, means creating a pressure differential between the displacer cylinder zone and said second zone adapted to act on the area of the piston rod in said second zone, said last named means including means for adding heat to or removing heat from each end of the displacer cylinder zone, means providing a power coupling between the displacer piston and the power piston consisting solely of fluid communication conductors between one end of the power cylinder and the displacer cylinder zone.]

[3. A Stirling cycle type device comprising a displacer piston, a piston rod adapted to reciprocate with the displacer piston, a cylinder for said displacer piston, an independent cylinder zone for the displacer piston rod, a regenerator for the displacer cylinder through which a gaseous operating medium flows during reciprocation of the displacer piston in its displacer cylinder, a power piston operatively associated with the displacer piston and mechanically free to move independently in respect to the displacer piston, a cylinder for the power piston, means for adding heat to or removing heat from each end of the displacer cylinder and means providing a power coupling and cooperative connective movement between the displacer piston and the power piston said last means consisting solely of fluid communication conductors between one end of the power cylinder and one end of the displacer cylinder associated therewith and means for removing power from or adding power to the power piston.]

[4. A Stirling cycle type device comprising a pair of opposed displacer pistons, a rigid rod interconnecting the displacer pistons for synchronous motion of said displacer pistons, a cylinder for each of said displacer pistons, a regenerator for each displacer cylinder through which a gaseous operating medium flows during reciprocation of each displacer piston in its displacer cylinder, a power piston operatively associated with each of the displacer pistons and mechanically free to move independently in respect to its associated displacer piston, a cylinder for each of the power pistons, means connecting the pair of power pistons for at least partial synchronous motion of said power pistons, means for adding heat to or removing heat from each end of the displacer cylinders and means providing a power coupling and cooperative connective movement between the displacer pistons and the power pistons associated with said displacer pistons, said last means consisting solely of fluid communication conductors between one end of one power cylinder and one end of the displacer cylinder associated therewith and between one end of the other power cylinder and one end of the displacer cylinder associated with said other power cylinder and means for removing power from or adding power to the power pistons.]

[5. The invention defined in claim 4 wherein said last named means comprises a fluid conductor arrangement for directing a hydraulic fluid to and from each power cylinder of each of the power pistons in a zone opposite to the portion of said power cylinders in fluid communication with the respective ends of their associated displacer cylinders.]

6. [The invention defined in claim 4 including] *A Stirling cycle type device comprising a pair of opposed displacer pistons, a rigid rod interconnecting the displacer pistons for synchronous motion of said displacer pistons, a cylinder for each of said displacer pistons, a regenerator for each displacer cylinder through which a gaseous operating medium flows during reciprocation of each displacer piston in its displacer cylinder, a power piston operatively associated with each of the displacer pistons and mechanically free to move independently in respect to its associated displacer piston, a cylinder for each of the power pistons, means connecting the pair of power pistons for at least*

*partial synchronous motion of said power pistons, means for adding heat to or removing heat from each end of the displacer cylinders and means providing a power coupling and cooperative connective movement between the displacer pistons and the power pistons associated with said displacer pistons, said last means consisting solely of fluid communication conductors between one end of one power cylinder and one end of the displacer cylinder associated therewith and between one end of the other power cylinder and one end of the displacer cylinder associated with said other power cylinder, means for removing power from or adding power to the power pistons, and* stop means for varying the length of travel of the displacer pistons in their cylinders.

7. [The invention defined in claim 4 including] *A Stirling cycle type device comprising a pair of opposed displacer pistons, a rigid rod interconnecting the displacer pistons for synchronous motion of said displacer pistons, a cylinder for each of said displacer pistons, a regenerator for each displacer cylinder through which a gaseous operating medium flows during reciprocation of each displacer piston in its displacer cylinder, a power piston operatively associated with each of the displacer pistons and mechanically free to move independently in respect to its associated displacer piston, a cylinder for each of the power pistons, means connecting the pair of power pistons for at least partial synchronous motion of said power pistons, means for adding heat to or removing heat from each end of the displacer cylinders and means providing a power coupling and cooperative connective movement between the displacer pistons and the power pistons associated with said displacer pistons, said last means consisting solely of fluid communication conductors between one end of one power cylinder and one end of the displacer cylinder associated therewith and between one end of the other power cylinder and one end of the displacer cylinder associated with said other power cylinder, means for removing power from or adding power to the power pistons, and* pressure fluid means for varying the travel of said displacer pistons in their cylinders.

8. The invention defined in claim 7 wherein the pressure fluid means for varying the travel of said displacer pistons comprises the gaseous working fluid.

9. The invention defined in claim 7 wherein the pressure fluid means for varying the travel of the displacer pistons comprises hydraulic fluid associated with the power pistons of the thermal device.

10. [The invention defined in claim 4 including] *Stirling cycle type device comprising a pair of opposed displacer pistons, a rigid rod interconnecting the displacer pistons for synchronous motion of said displacer pistons, a cylinder for each of said displacer pistons, a regenerator for each displacer cylinder through which a gaseous operating medium flows during reciprocation of each displacer piston in its displacer cylinder, a power piston operatively associated with each of the displacer pistons and mechanically free to move independently in respect to its associated displacer piston, a cylinder for each of the power pistons, means connecting the pair of power pistons for at least partial synchronous motion of said power pistons, means for adding heat to or removing heat from each end of the displacer cylinders and means providing a power coupling and cooperative connective movement between the displacer pistons and the power pistons associated with said displacer pistons, said last means consisting solely of fluid communication conductors between one end of one power cylinder and one end of the displacer cylinder associated therewith and between one end of the other power cylinder and one end of the displacer cylinder associated with said other power cylinder, means for removing power from or adding power to the power pistons, and* adjustable mechanical stop means for limiting the motion of said piston rod connecting the displacer pistons.

*11. A Stirling cycle type device comprising a displacer piston, a displacer cylinder zone, said displacer piston mounted for reciprocation in said displacer cylinder zone, a displacer piston rod connected at one end to said displacer piston and in fluid communication at the other end with a second zone, a power piston, a power cylinder, said power piston mounted for reciprocation in the power cylinder normally mechanically independent of the reciprocation of the displacer piston, a working fluid in said displacer cylinder zone, means creating a pressure differential between the displacer cylinder zone and said second zone adapted to act on the area of the piston rod in said second zone, said last named means including means for adding heat to or removing heat from each end of the displacer cylinder zone, means providing a power coupling between the displacer piston and the power piston consisting solely of fluid communication conductors between one end of the power cylinder and the displacer cylinder zone, wherein said second zone is sealed against the pressure in the displacer cylinder zone, and a spring acting on that end of the displacer piston rod which is arranged in the space sealed against the pressure of the displacer cylinder zone.*

*12. The Stirling cycle type device as defined in claim 11 further including a second spring arranged in the same space and acting on the power piston, the restoring force of the said springs predominating over the compressive force at the end of the expansion of the working fluid.*

* * * * *